Nov. 17, 1953

L. SPRARAGEN 2,659,117

BEADING STRIP

Filed Oct. 20, 1951

Inventor
Louis Spraragen
By
Johnson and Kline
Attorneys

Patented Nov. 17, 1953

2,659,117

UNITED STATES PATENT OFFICE 2,659,117

BEADING STRIP

Louis Spraragen, Fairfield, Conn., assignor to Bridgeport Fabrics, Inc., Bridgeport, Conn., a corporation of Connecticut Application October 20, 1951, Serial No. 252,277

6 Claims. (Cl. 20—69)

The present invention relates to beading strips and more particularly to beading strips for weatherproofing and/or ornamental purposes.

Beading strips of the type herein disclosed have been used as a means for weatherproofing and/or providing ornamentation about openings in automobile or the like bodies. It has been a problem to provide such a strip which could be readily installed and yet easily and cheaply manufactured.

One effort to solve this problem has been to provide a sponge rubber bead with a fabric cover having a width greater than the circumference of the bead and having the edges of the fabric secured together to extend out from the bead to form an attaching member whereby the sponge may be mounted on the body. On the secured-together edges there has been provided a plastic L-shaped member with the flange projecting therefrom which provides for holding the strip on a support. This type of construction, however, has not been satisfactory since the bead, being connected to the support merely through the fabric material, was not stiff enough to be pressed with sufficient force against the door or other closure to produce an adequate seal and furthermore it required additional operations in the manufacture which tend to increase the cost.

The present invention overcomes these difficulties by providing a beading strip which is easily mounted on the body and may be manufactured at substantially no increase in cost over those heretofore made and has a stiffness sufficient to provide for adequate seal in weatherproofing the opening.

This has been accomplished by providing the bead with an attaching strip which is anchored to the bead and provided with a longitudinal projection in spaced relation to the bead and extending from the plane of the attaching strip which is sufficiently rigid to cooperate with the support to hold the beading strip in place.

The required stiffness of the attaching strip in transverse direction, can be obtained by various ways. In the illustrated form of the invention wires or the like stiffening members extend transversely, in which case the longitudinal projection is formed by a bend in the wires intermediate their ends.

In the more specific aspects of the invention the attaching strip can be formed as a woven fabric having wire wefts and fibrous warps. This strip is readily flexible to permit manipulation of the beading strip around curves and irregular surfaces and yet is sufficiently stiff to provide for adequate pressure of the bead against the closure and firm support for mounting the strip. The woven fabric is provided with a bent loop intermediate its edges and extending longitudinally thereof producing a flange-engaging abutment adjacent the bead and forming a channel with the bead to receive the flange on the automobile to support the same. This structure can be readily mounted on the automobile and can be easily manufactured without substantially increasing the cost over beading strips having flat attaching flanges.

If it is desired to utilize the beading strip for the purpose of ornamentation, it can be covered with a suitable covering material to provide an attractive and pleasing appearance.

Other features and advantages of the invention will be apparent from the specification and claims when considered in connection with the drawings in which:

Figure 1:
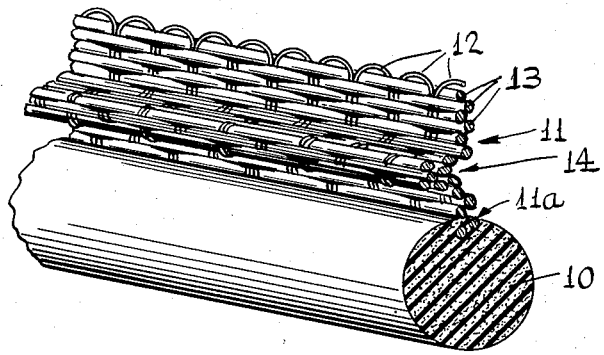
Figure 1 shows a perspective view, partly in section of the bead and attaching strip.
Figure 2:
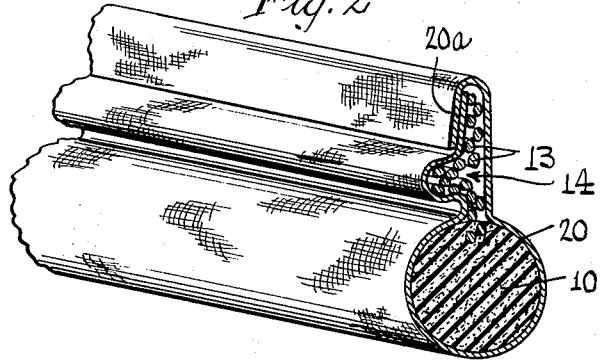
Fig. 2 is a view similar to Fig. 1 showing the bead and attaching strip covered.

The beading strip of the present invention comprises a bead 10 of compressible material, herein illustrated as sponge rubber, having a relatively stiff attaching flange 11 secured thereto. In the herein preferred form of the invention the attaching flange has one edge 11a embedded in the bead so that the remainder of the strip projects outwardly from the bead. This can be accomplished by assembling the parts of the bead on the edge or by forming the bead on the edge in its manufacture as in the case of a blown sponge rubber bead.

While the attaching flange may be formed of any material which will provide the sufficient stiffness for mounting the bead, it is herein illustrated as being formed of a woven fabric having wire wefts 12 and fibrous warps 13. The warps may be made of textile material, paper or other like material. The wefts, as shown in Fig. 3, extend beyond one edge of the warps and provide loops 12a extending into the bead to facilitate the anchoring of the bead to the edge of the attaching strip.

Figure 3:
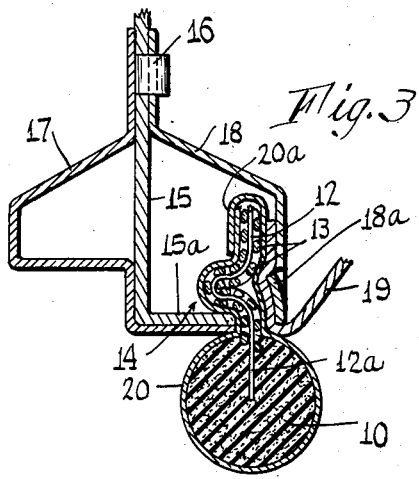
Fig. 3 is a fragmentary sectional view showing the beading strip installed.

Intermediate the edge of the attaching strip there is provided a longitudinally extending portion 14 projecting from the plane of the attaching strip and which cooperates with the flange on the automobile body, as shown in Fig. 3, to mount the beading strip on the automobile body, In the preferred form of the invention this projection is formed, before or after it is assembled with the bead, by passing the strip through a series of suitably shaped rollers and bending the attaching strip longitudinally as shown in the drawings.

The beading strip of the present invention is shown in Fig. 3 as installed about an opening on an automobile body. The body has a main mounting or frame member 15 provided with a flange 15a and having lanced-out tongues 16 which project inwardly. The other side of the member 15 is covered by the outer trim 17 which forms the frame for receiving the door or the like closure. Overlying the inner face of the mounting member 15 is a keeper plate 18 which is locked in place by the tongues 16 passing through openings in the plate folded thereover. The keeper plate extends down so as to overlie the end of the flange as shown in Fig. 3. It can be installed after the beading strip has been put in place or the strip can be inserted between the plate and edge of the flange after the plate has been secured. The surface of the keeper plate which overlies the strip 11 has lanced-out barbs 18a which face inwardly and aid in holding the beading strip against unintentional removal while permitting ready insertion of the strip. The barbs also aid in holding the edge of the interior top cover 19 which is carried around the edge of the plate and tucked in alongside of the strip 11 as shown in Fig. 3.

Thus it will be seen that the beading strip of the present invention can be made very simply by merely providing a bend in the flat attaching strip intermediate the edges and by supporting the strip from the bend by the mounting flange.

If desired, ornamentation of the bead may be accomplished by providing a bead with a suitable cover of any covering material such as fabric, rubber, plastics or the like. In the herein illustrated form of the invention a fabric cover 20 which blends with the interior trim of the automobile is employed. It overlies the face of the attaching strip having the projection, extends around the bead, and overlies the opposite face of the attaching strip. If desired, the end 20a of the cover is folded over the free edge of the attaching strip to provide a completely finished appearance for the beading strip.

Variations and modifications may be made within the scope of the claims and portions of the improvements may be used without others.

I claim:

1. A beading strip comprising a flexible bead of compressible material; an attaching strip having one edge secured to the bead with the strip projecting therefrom, said strip having a metallic portion therein providing a longitudinally extending portion intermediate its edges projecting from the plane of the strip and cooperating with the bead to form a flange-receiving channel for mounting the beading strip; and a cover enclosing the bead and attaching strip.

2. A beading strip comprising a flexible bead of compressible material; an attaching strip including a metallic reenforcing member having one edge inserted in and secured to the bead with the strip projecting therefrom, said strip having a longitudinal bend in the reenforcing member intermediate its edges projecting from the plane of the strip and cooperating with the bead to form a flange-receiving channel for mounting the strip; and a cover enclosing the bead and attaching strip.

3. A strip comprising a flexible bead of compressible material; an attaching strip having one edge anchored within the bead with the strip projecting therefrom, said strip having reenforcing means therein and extending longitudinally thereof and providing a longitudinally, nonyielding extending rib portion intermediate the edges of the strip and forming a flange-engaging extension projecting from the plane of the strip adjacent the bead for mounting the beading strip on a support; and a cover enclosing the bead and attaching strip.

4. A beading strip comprising a flexible bead of compressible material; an attaching strip including a plurality of transversely extending wires therein, said strip having one edge secured to the bead with the strip projecting therefrom and having a longitudinally extending bent portion intermediate its edges projecting from the plane of the strip and forming a flange-engaging abutment facing the bead for mounting the beading strip; and a cover enclosing the bead and attaching strip.

5. In a beading strip, a flexible bead of sponge rubber and an attaching strip having one edge embedded in the bead with the strip projecting therefrom, said strip comprising a woven member having transversely extending wire wefts and fibrous warps with the wefts projecting beyond the warps to form loops along the embedded edge of the strip and said strip having a longitudinal bend intermediate its edges forming a loop projecting from the plane of the strip and cooperating with the bead to form a flange-receiving channel for mounting the strip.

6. An attaching strip for a beading strip having a flexible bead comprising a woven strip having transversely extending wire wefts and fibrous warps with the wefts projecting beyond the warps to form loops along one edge of the strip adapted to be embedded in said bead and having a longitudinal bend intermediate its edges forming an abutment projecting from the plane of the strip and cooperating with the bead to form a flange-receiving channel for mounting the strip.

LOUIS SPRARAGEN.

References Cited in the file of this patent

UNITED STATES PATENTS

| Number | Name | Date |
|---|---|---|
| 1,837,443 | Jarrow | Dec. 22, 1931 |
| 1,932,822 | Holbrook | Oct. 31, 1933 |
| 2,347,158 | Spraragen | Apr. 18, 1944 |

FOREIGN PATENTS

| Number | Country | Date |
|---|---|---|
| 104,676 | Sweden | Apr. 1, 1942 |
| 820,238 | France | July 26, 1937 |